United States Patent
Diao et al.

(10) Patent No.: US 11,015,343 B1
(45) Date of Patent: May 25, 2021

(54) LAMINATED PLATE-TYPE SANDWICH INSULATION SHEAR WALL WITH TIE BOLTS AND INSTALLATION METHOD THEREOF

(71) Applicant: Hongwei Diao, Liaoning (CN)

(72) Inventors: Hongwei Diao, Shenyang (CN); Hao Wu, Shenyang (CN)

(73) Assignee: Hongwei Diao, Shenyang (CN)

( * ) Notice: Subject to any disclaimer, the term of this patent is extended or adjusted under 35 U.S.C. 154(b) by 140 days.

(21) Appl. No.: 16/488,748

(22) PCT Filed: Jan. 25, 2018

(86) PCT No.: PCT/CN2018/074091
§ 371 (c)(1),
(2) Date: Aug. 26, 2019

(87) PCT Pub. No.: WO2018/161732
PCT Pub. Date: Sep. 13, 2018

(30) Foreign Application Priority Data

Mar. 7, 2017 (CN) .......................... 201710129917.5

(51) Int. Cl.
*E04B 2/86* (2006.01)
*E04B 1/61* (2006.01)
(Continued)

(52) U.S. Cl.
CPC .............. *E04B 2/8635* (2013.01); *B32B 7/08* (2013.01); *B32B 13/04* (2013.01); *E04B 1/61* (2013.01);
(Continued)

(58) Field of Classification Search
CPC ........ E04B 2/8635; E04B 1/7629; E04B 1/61; E04B 2/8647; E04B 2103/02;
(Continued)

(56) References Cited

U.S. PATENT DOCUMENTS

| | | | | |
|---|---|---|---|---|
| 5,230,191 A | * | 7/1993 | Mayrand | B28B 7/0088 52/259 |
| 6,263,638 B1 | * | 7/2001 | Long, Sr. | B28B 23/028 52/794.1 |

(Continued)

FOREIGN PATENT DOCUMENTS

| | | |
|---|---|---|
| CN | 104790569 A | 7/2015 |
| CN | 105569208 A | 5/2016 |

(Continued)

OTHER PUBLICATIONS

Mar. 27, 2018 International Search Report issued in International Patent Application No. PCT/CN2018/074091.
(Continued)

*Primary Examiner* — Patrick J Maestri
(74) *Attorney, Agent, or Firm* — Oliff PLC

(57) ABSTRACT

A laminated plate-type sandwich insulation shear wall with tie bolts, including a prefabricated external wall, a sandwich insulation layer, a cast-in-place concrete layer, a prefabricated internal laminated wall board, and an external wall connector. Several bolts disposed between the external wall and the internal laminated wall board. Each tie bolt consists of cylinder head screw, gland, sleeve, and tie screw casing. During installation, the sandwich insulation wall with the bolts are installed in place in a suspended manner and is temporarily fixed, the tying and connection of reinforcing steel bars is completed, a formwork is supported, concrete is poured, the cylinder head screw is removed after the cast-in-place concrete solidifies and the strength of the cast-in-place concrete increases, and the bolt hole is filled with foamed polyurethane. The sandwich insulation wall solves the problem of mutual destruction of the external and internal walls due to the indoor and outdoor temperatures.

5 Claims, 2 Drawing Sheets

(51) Int. Cl.
*E04B 1/76* (2006.01)
*B32B 7/08* (2019.01)
*B32B 13/04* (2006.01)

(52) U.S. Cl.
CPC .......... *E04B 1/7629* (2013.01); *E04B 2/8647* (2013.01); *B32B 2307/304* (2013.01); *B32B 2607/00* (2013.01); *E04B 2/8605* (2013.01); *E04B 2103/02* (2013.01); *E04B 2103/04* (2013.01)

(58) Field of Classification Search
CPC ............... E04B 2103/04; E04B 2/8605; E04B 2307/304; E04B 2607/00; E04B 1/4178; E04B 1/7616; E04B 1/62; B32B 13/04; B32B 7/08; B32B 2307/304; B32B 2607/00; E04C 2/288
See application file for complete search history.

(56) References Cited

U.S. PATENT DOCUMENTS

| | | | | |
|---|---|---|---|---|
| 2014/0308509 | A1* | 10/2014 | Gaddes | E04B 1/161 428/223 |
| 2015/0121792 | A1* | 5/2015 | Spoo | E04B 1/40 52/483.1 |
| 2016/0069067 | A1* | 3/2016 | Ciuperca | E04C 2/34 52/309.8 |
| 2018/0258637 | A1* | 9/2018 | Saihara | E04G 11/12 |

FOREIGN PATENT DOCUMENTS

| | | |
|---|---|---|
| CN | 205976505 U | 2/2017 |
| CN | 106639071 A | 5/2017 |
| CN | 206529942 U | 9/2017 |
| JP | 2004-076399 A | 3/2004 |

OTHER PUBLICATIONS

Mar. 27, 2018 Written Opinion issued in International Patent Application No. PCT/CN2018/074091.

* cited by examiner

LAMINATED PLATE-TYPE SANDWICH INSULATION SHEAR WALL WITH TIE BOLTS AND INSTALLATION METHOD THEREOF

BACKGROUND OF THE INVENTION

1. Technical Field

The invention belongs to the field of laminated plate-type sandwich insulation shear walls in prefabricated concrete construction, and particularly relates to a laminated plate-type sandwich insulation shear wall with tie bolts and an installation method thereof.

2. Description of Related Art

Laminated plate-type sandwich insulation shear walls on the current market are not provided with tie bolts separately, a prefabricated external wall is connected with a prefabricated internal laminated wall board through an external wall connector, and thus, the external wall connector is not only used for connecting an external wall with an internal wall, but also is used for connecting the prefabricated external wall with the prefabricated internal laminated wall board. Such laminated plate-type sandwich insulation shear walls mainly have the following problems: the stress requirement of the external wall connector of the laminated plate-type sandwich insulation shear wall is different from that of the tie bolts used for connecting the prefabricated external wall with the prefabricated internal laminated wall board, and particularly, the stress of the tie bolts should be much larger than that of the external wall connector. If the external wall connector is configured according to the stress requirement of its own, the external wall connector will be broken during concrete pouring of the laminated plate-type sandwich insulation shear walls. While if the external wall connector is configured according to the stress requirement of the tie bolts, the cost will be increased, the external wall connector will apply a higher constraining force, which greatly exceeds the designed constraining force, to the external wall and then cannot deform anymore, and consequentially, mutual destruction of the external wall and the internal wall may be caused by the difference between indoor and outdoor temperatures.

BRIEF SUMMARY OF THE INVENTION

The objective of the invention is to provide a laminated plate-type sandwich insulation shear wall with tie bolts and an installation method thereof to solve the problem of mutual destruction of the external wall and the internal wall of traditional laminated plate-type sandwich insulation shear walls due to the difference between indoor and outdoor temperatures.

The technical solution of the invention is as follows:

A laminated plate-type sandwich insulation shear wall with tie bolts includes a prefabricated external wall, a sandwich insulation layer, a cast-in-place concrete layer, a prefabricated internal laminated wall board, and an external wall connector, wherein a plurality of tie bolts are disposed between the prefabricated external wall and the prefabricated internal laminated wall board, and each tie bolt consists of a cylinder head screw, a gland, a sleeve, and a tie screw casing; the cylinder head screw includes a cylinder head and a tie screw, and an internal hexagonal groove is formed in the head of the cylinder head screw; the gland is embedded into the prefabricated external wall and has an opening located on the internal wall surface of the prefabricated external wall, and internal gland threads are arranged in the gland; the sleeve is embedded into the prefabricated internal laminated wall board and has an internal wall provided with internal sleeve threads, an opening in one side of the sleeve is located on the internal wall of the prefabricated internal laminated wall board, and an opening in the other side of the sleeve is located on the external wall of the prefabricated internal laminated wall board; a round pit corresponding to the cylinder head is formed in the opening, located on the external wall of the prefabricated internal laminated wall board, of the sleeve; the tie screw casing is arranged outside the tie screw of the cylinder head screw and has two ends which are respectively in close contact with the edge of the opening of the gland and the edge of the opening, located on the internal wall of the prefabricated internal laminated wall board, of the sleeve; and the sandwich insulation layer is attached to the internal surface of the prefabricated external wall, the cylinder head screw is screwed to penetrate through the sleeve and then penetrates through the tie screw casing to be finally screwed into the gland so that the prefabricated external wall and the prefabricated internal laminated wall board are connected, and the cast-in-place concrete layer is formed between the sandwich insulation layer and the prefabricated internal laminated wall board.

The two ends of the tie screw casing are provided with end caps through which the two ends of the tie screw casing are respectively in closer contact with the edge of the opening of the gland and the edge of the opening, located on the internal wall of the prefabricated internal laminated wall board, of the sleeve.

The gland embedded into the prefabricated external wall is provided with a gland embedding fin, and the sleeve embedded into the prefabricated internal laminated wall board is provided with a sleeve embedding fin.

The cylinder head of the cylinder head screw is in a truncated cone shape, so that the cylinder head screw is convenient to unscrew after construction.

The external wall connector includes an external wall embedding part, an insulation layer connecting part penetrating through the sandwich insulation layer, an expanding disk pressing against one side surface of the cast-in-place concrete layer of the sandwich insulation layer, and an internal wall anchoring part embedded into the cast-in-place concrete layer after construction.

After the laminated plate-type sandwich insulation shear wall with tie bolts is installed in place in a suspended manner and is temporarily fixed, the tying and connection of reinforcing steel bars are completed, a formwork is supported, concrete is poured, the internal wall anchoring part of the external wall connector is embedded into the cast-in-place concrete layer, and the cast-in-place concrete layer formed after the concrete is poured is integrated with the prefabricated internal laminated wall board, so that an internal wall in a whole sandwich insulation shear wall system is formed; the cylinder head screw is removed after the cast-in-place concrete solidifies and the strength of the cast-in-place concrete increases, a hole of each tie bolt is filled with foamed polyurethane, then a round pit in the external wall of the prefabricated internal laminated wall board is filled with the concrete to be leveled, a measure for preventing surface cracking is taken, and in this way, the installation of a whole sandwich insulation shear wall is completed.

DETAILED DESCRIPTION OF THE INVENTION

Specific implementation: laminated plate-type sandwich insulation shear walls on the current market are not provided with tie bolts, a prefabricated external wall is connected with a prefabricated internal laminated wall board through an external wall connector, and thus, the external wall connector used for connecting an external wall with an internal wall is also used for connecting the prefabricated external wall with the prefabricated internal laminated wall board.

Figure 1:
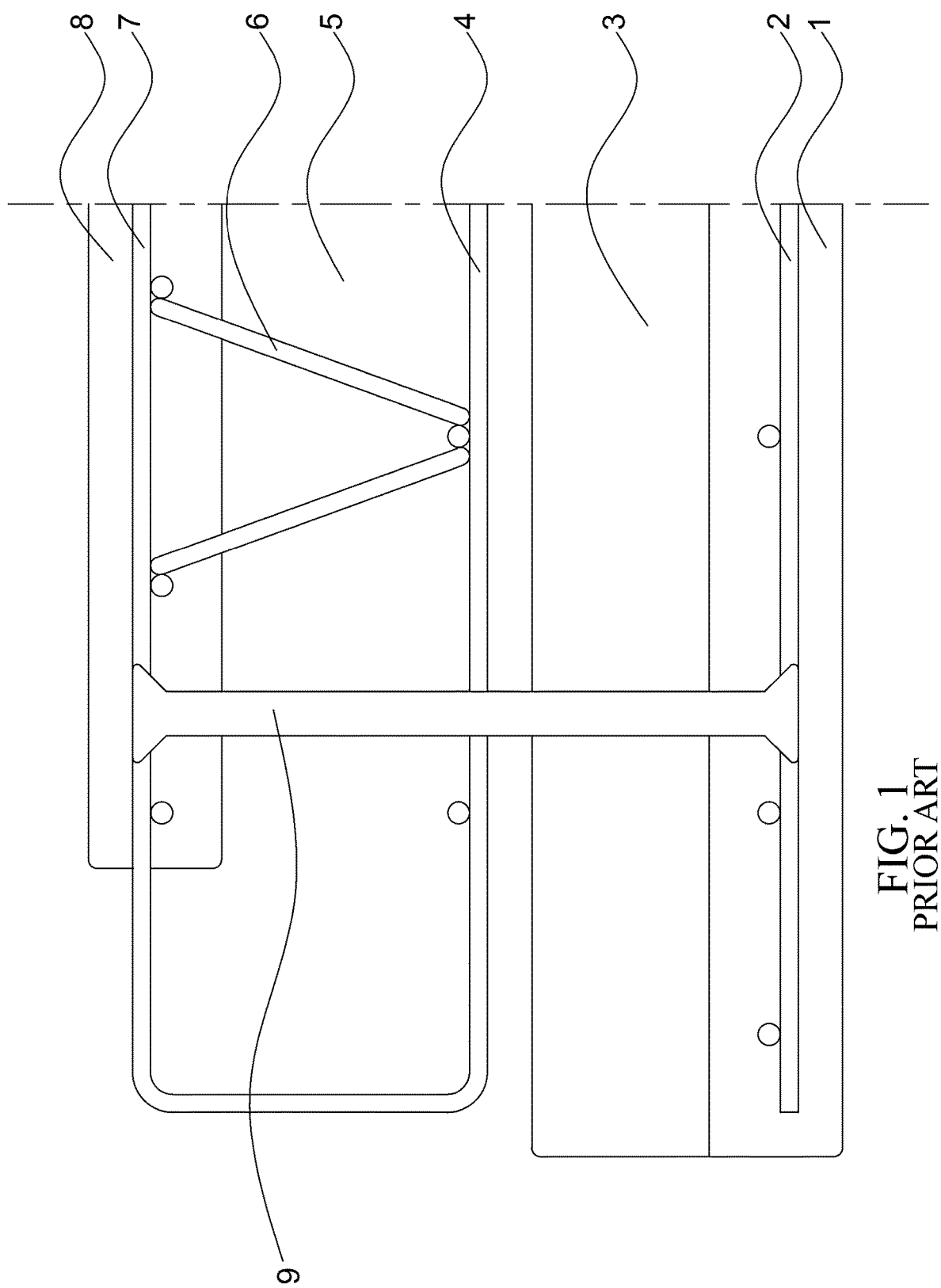
FIG. 1 is a structural sectional view of a traditional laminated plate-type sandwich insulation shear wall.

Embodiment 1: the invention is an improvement on the traditional laminated plate-type sandwich insulation shear wall system. FIG. 1 is a structural sectional view of the traditional laminated plate-type sandwich insulation shear wall. Reference Signs in FIG. 1: 1, prefabricated external wall; 2, external wall reinforcing mesh; 3, sandwich insulation layer; 4, cast-in-place concrete layer reinforcing mesh; 5, cast-in-place concrete layer; 6, truss bar; 7, prefabricated internal laminated wall board reinforcing mesh; 8, prefabricated internal laminated wall board; 9, external wall connector.

Figure 2:
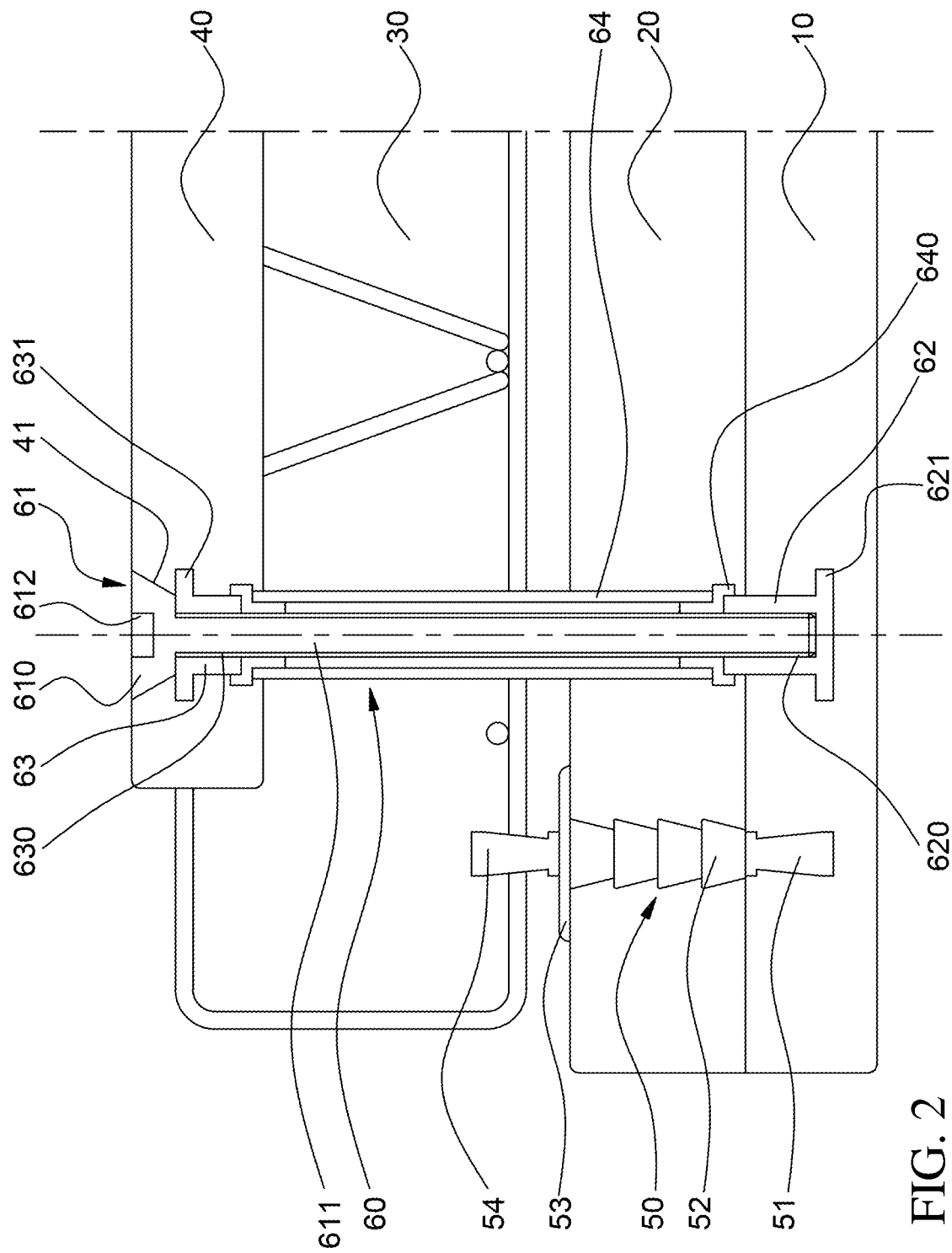
FIG. 2 is a structural sectional view of the invention.

As shown in FIG. 2, a laminated plate-type sandwich insulation shear wall with tie bolts of the invention includes a prefabricated external wall 10, a sandwich insulation layer 20, a cast-in-place concrete layer 30, a prefabricated internal laminated wall board 40, and an external wall connector 50, wherein a plurality of tie bolts 60 are disposed between the prefabricated external wall 10 and the prefabricated internal laminated wall board 40, and each tie bolt 60 consists of a cylinder head screw 61, a gland 62, a sleeve 63, and a tie screw casing 64; the cylinder head screw 61 includes a cylinder head 610 and a tie screw 611, and an internal hexagonal groove 612 is formed in the head of the cylinder head screw 61; the gland 62 is embedded into the prefabricated external wall 10 and has an opening located on the internal wall surface of the prefabricated external wall 10, and internal gland threads 620 are arranged in the gland 62; the sleeve 63 is embedded into the prefabricated internal laminated wall board 40 and has an internal wall provided with internal sleeve threads 630, an opening in one side of the sleeve 63 is located on the internal wall of the prefabricated internal laminated wall board 40, and an opening in the other side of the sleeve 63 is located on the external wall of the prefabricated internal laminated wall board 40; a round pit 41 corresponding to the cylinder head 610 is formed in the opening, located on the external wall of the prefabricated internal laminated wall board 40, of the sleeve 63; the tie screw casing 64 is arranged outside the tie screw 611 of the cylinder head screw 61 and has two ends which are respectively in close contact with the edge of the opening of the gland 62 and the edge of the opening, located on the internal wall of the prefabricated internal laminated wall board 40, of the sleeve 63; and the sandwich insulation layer 20 is attached to the internal surface of the prefabricated external wall 10, the cylinder head screw 61 is screwed to penetrate through the sleeve 63 and then penetrates through the tie screw casing 64 to be finally screwed into the gland 62, so that the prefabricated external wall 10 and the prefabricated internal laminated wall board 40 are connected, and the cast-in-place concrete layer 30 is formed between the sandwich insulation layer 20 and the prefabricated internal laminated wall board 40.

The two ends of the tie screw casing 64 are provided with end caps 640 through which the two ends of the tie screw casing 64 are respectively in closer contact with the edge of the opening of the gland 62 and the edge of the opening, located on the internal wall of the prefabricated internal laminated wall board 40, of the sleeve 63.

The gland 62 embedded into the prefabricated external wall 10 is provided with a gland embedding fin 621, and the sleeve 63 embedded into the prefabricated internal laminated wall board 40 is provided with a sleeve embedding fin 631.

The cylinder head 610 of the cylinder head screw 61 is in a truncated cone shape, so that the cylinder head screw 61 is convenient to unscrew after construction.

The external wall connector 50 includes an external wall embedding part 51, an insulation layer connecting part 52 penetrating through the sandwich insulation layer 20, an expanding disk 53 pressing against one side surface of the cast-in-place concrete layer 30 of the sandwich insulation layer 20, and an internal wall anchoring part 54 embedded into the cast-in-place concrete layer 30 after construction.

After the laminated plate-type sandwich insulation shear wall with tie bolts is installed in place in a suspended manner and is temporarily fixed, the tying and connection of reinforcing steel bars are completed, a formwork is supported, concrete is poured, the internal wall anchoring part 54 of the external wall connector 50 is embedded into the cast-in-place concrete layer 30, and the cast-in-place concrete layer 30 formed after the concrete is poured is integrated with the prefabricated internal laminated wall board 40, so that an internal wall in a whole sandwich insulation shear wall system is formed. The cylinder head screw 61 is removed after the cast-in-place concrete solidifies and the strength of the cast-in-place concrete increases, a hole of each tie bolt is filled with foamed polyurethane, then a round pit 41 in the external wall of the prefabricated internal laminated wall board 40 is filled with the concrete to be leveled, and a measure for preventing surface cracking is taken.

What is claimed is:

1. A laminated plate-type sandwich insulation shear wall with tie bolts, comprising a prefabricated external wall, a sandwich insulation layer, a cast-in-place concrete layer, a prefabricated internal laminated wall board, and an external wall connector, wherein a plurality of tie bolts are disposed between the prefabricated external wall and the prefabricated internal laminated wall board, and each said tie bolt consists of a cylinder head screw, a gland, a sleeve, and a tie screw casing; the cylinder head screw includes a cylinder head and a tie screw, and an internal hexagonal groove is formed in a head of the cylinder head screw; the gland is embedded into the prefabricated external wall and has an opening located on an internal wall surface of the prefabricated external wall, and internal gland threads are arranged in the gland; the sleeve is embedded into the prefabricated internal laminated wall board and has an internal wall provided with internal sleeve threads, an opening in one side of the sleeve is located on an internal wall of the prefabricated internal laminated wall board, and an opening in another side of the sleeve is located on an external wall of the prefabricated internal laminated wall board; a round pit corresponding to the cylinder head is formed in the opening, located on the external wall of the prefabricated internal laminated wall board, of the sleeve; the tie screw casing is arranged outside the tie screw of the cylinder head screw and has two ends which are respectively in close contact with an edge of the opening of the gland and an edge of the opening, located on the internal wall of the prefabricated internal laminated wall board, of the sleeve; and the sandwich insulation layer is attached to an internal surface of the prefabricated external wall, the cylinder head screw is screwed to penetrate through the sleeve and then penetrates through the tie screw casing to be finally screwed into the gland so that the prefabricated external wall and the prefabricated internal laminated wall board are connected, and the cast-in-place concrete layer is formed between the sandwich insulation layer and the prefabricated internal laminated wall board.

2. The laminated plate-type sandwich insulation shear wall with tie bolts according to claim 1, wherein the two ends of the tie screw casing are provided with end caps through which the two ends of the tie screw casing are respectively in closer contact with the edge of the opening of the gland and the edge of the opening, located on the internal wall of the prefabricated internal laminated wall board, of the sleeve.

3. The laminated plate-type sandwich insulation shear wall with tie bolts according to claim 1, wherein the gland embedded into the prefabricated external wall is provided with a gland embedding fin, and the sleeve embedded into the prefabricated internal laminated wall board is provided with a sleeve embedding fin.

4. The laminated plate-type sandwich insulation shear wall with tie bolts according to claim 1, wherein the cylinder head of the cylinder head screw is in a truncated cone shape, so that the cylinder head screw is convenient to unscrew after construction.

5. The laminated plate-type sandwich insulation shear wall with tie bolts according to claim 1, wherein the external wall connector includes an external wall embedding part, an insulation layer connecting part penetrating through the sandwich insulation layer, an expanding disk pressing against one side surface of the cast-in-place concrete layer of the sandwich insulation layer, and an internal wall anchoring part embedded into the cast-in-place concrete layer after construction.

\* \* \* \* \*